US005181024A

United States Patent [19]

Tsunoda et al.

[11] Patent Number: 5,181,024

[45] Date of Patent: Jan. 19, 1993

[54] BOOK TYPE WIRELESS REMOTE CONTROL APPARATUS

[75] Inventors: Hideo Tsunoda, Numazu; Yoshihiro Ichikawa, Fujinomiya, both of Japan

[73] Assignee: Kabushiki Kaisha Toshiba, Kawasaki, Japan

[21] Appl. No.: 668,726

[22] Filed: Mar. 13, 1991

Related U.S. Application Data

[63] Continuation of Ser. No. 441,607, Nov. 27, 1989, abandoned.

[30] Foreign Application Priority Data

Nov. 30, 1988 [JP] Japan .............................. 63-302445

[51] Int. Cl.$^5$ ............................................ H04N 5/44

[52] U.S. Cl. ........................ 340/825.690; 340/825.72; 358/194.1; 341/22; 341/23; 359/142

[58] Field of Search ...................... 340/825.69, 825.72; 358/194.1; 341/176, 22, 23; 379/102; 455/128, 95; 359/142

[56] References Cited

U.S. PATENT DOCUMENTS

| | | | |
|---|---|---|---|
| 3,364,344 | 4/1966 | Marcellino | 362/802 |
| 4,574,285 | 3/1986 | Bascou | 340/825.69 |
| 4,745,397 | 5/1988 | Lagerbaner et al. | 341/23 |
| 4,872,095 | 10/1989 | Dubak et al. | 362/802 |
| 4,887,055 | 10/1989 | Kasahara | 358/194.1 |
| 4,893,222 | 1/1990 | Mintzer | 362/109 |
| 4,939,514 | 7/1990 | Miyazaki | 341/22 |

FOREIGN PATENT DOCUMENTS

| | | | |
|---|---|---|---|
| 0105164 | 6/1984 | Japan | 341/23 |
| 61-142248 | 9/1986 | Japan . | |
| 61-156380 | 9/1986 | Japan . | |
| 0115497 | 5/1988 | Japan | 341/176 |

*Primary Examiner*—Donald J. Yusko
*Assistant Examiner*—Peter S. Weissman
*Attorney, Agent, or Firm*—Cushman, Darby & Cushman

[57] ABSTRACT

Each of first and second cases has a portable size and provides an operation portion, disposed at least on its inner surface, for setting operation conditions of an appliance to be controlled. A movable joint connects the first and second cases to form a book type case which can be freely opened/closed while the operation portions oppose each other. A transmitter is disposed in the movable joint and radio-transmits transmission data representing the set operation conditions of the appliance.

5 Claims, 8 Drawing Sheets

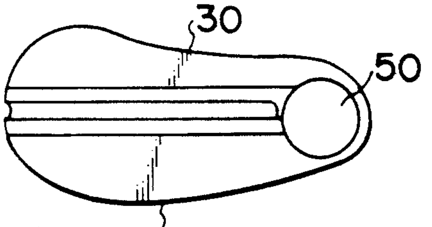
FIG. 7C
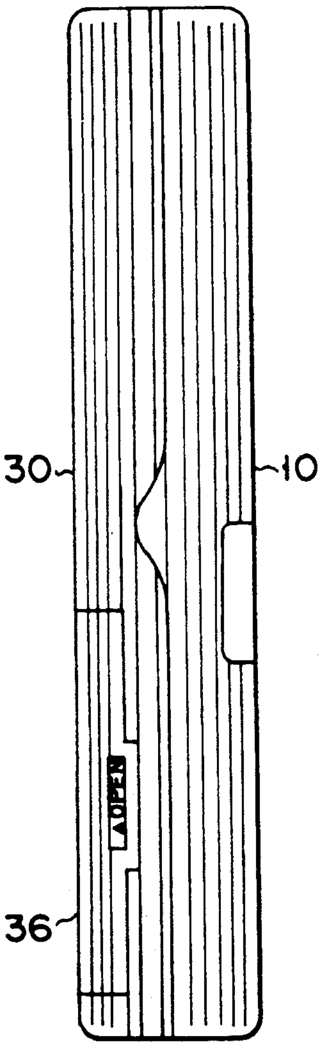
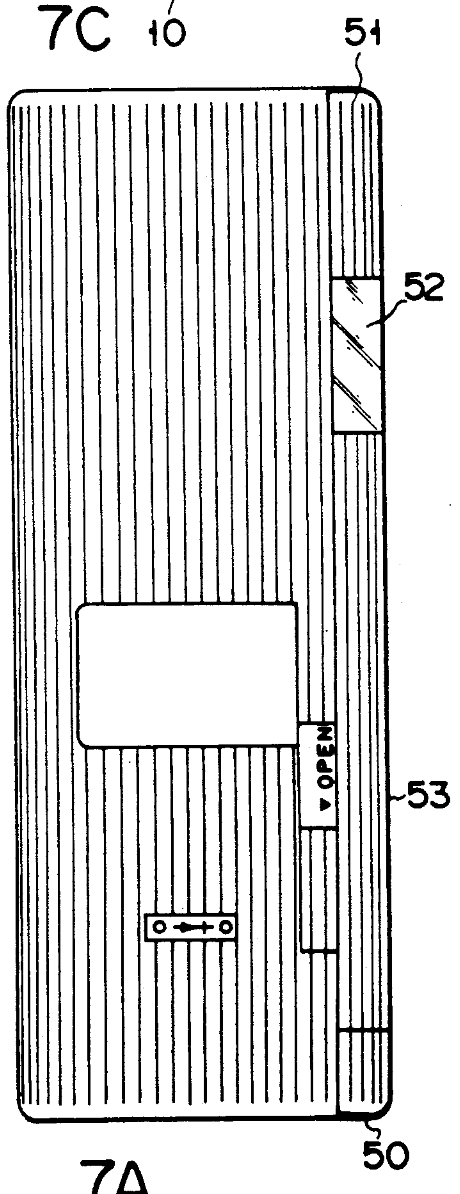
FIG. 7A
FIG. 7B
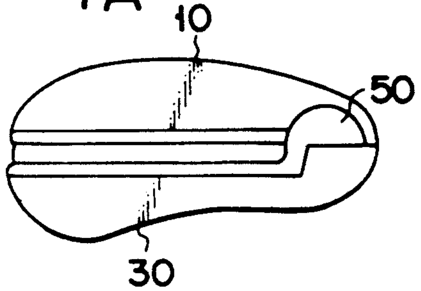
FIG. 7D

BOOK TYPE WIRELESS REMOTE CONTROL APPARATUS

This is a continuation of application Ser. No. 07/441,607 filed on Nov. 27, 1989, which was abandoned upon the filing hereof.

BACKGROUND OF THE INVENTION

1. Field of the Invention

The present invention generally relates to a wireless remote control apparatus and, more particularly, to a wireless remote control apparatus for use in a domestic appliance such as an air conditioner.

2. Description of the Related Art

Generally, a domestic appliance such as an air conditioner includes a remote control apparatus for controlling operation conditions so that a user can input operation conditions from a remote place.

As such a remote control apparatus, a wireless remote control apparatus which transmits data by infrared rays is available. Recently, an operation portion of such a wireless remote control apparatus has been increased in size, and its operability has been improved accordingly.

When the operation portion of the apparatus is increased in size, however, its portability is degraded because its main body cannot be made compact.

In addition, such a wireless remote control apparatus for use in a domestic appliance must be easily operated by any user. In general, however, aged people tend to avoid using an apparatus of this type because a conventional wireless remote control apparatus has many difficult problems especially for aged people.

That is, while a simple and easy operation is required to facilitate use of such an apparatus for aged people, a concept of small size and light weight must be satisfied to a certain degree.

In addition, a main concept of maintaining a multifunction property of the apparatus as a whole must be satisfied so that maximum performance of an appliance is obtained.

A wireless remote control apparatus of this type, therefore, must satisfy the two contradictory concepts as described above at the same time.

Furthermore, a conventional wireless remote control apparatus sometimes cannot be operated at night because of darkness.

In order to solve this problem, illuminating means may be provided for an operation portion and turned on by an internal battery at night.

Since, however, transmission contents of a remote control apparatus especially for use in an air conditioner are complicated and long, the service life of the internal battery is extremely shortened if power is additionally consumed for illumination.

If a large number of batteries are used, the size of the apparatus is increased to degrade its portability.

SUMMARY OF THE INVENTION

It is, therefore, an object of the present invention to provide a new and improved wireless remote control apparatus which can increase the size of an operation portion and therefore improve its operability while maintaining a small size of a main body.

It is another object of the present invention to provide a wireless remote control apparatus which can increase the size of an operation portion and therefore improve its operability while maintaining a small size of a main body and can reliably display, to a user, information representing whether transmission is performed.

It is still another object of the present invention to provide a wireless remote control apparatus which can be easily and reliably operated at night or in a dark place without increasing power consumption and therefore without increasing its size or degrading its portability.

It is still another object of the present invention to provide a wireless remote control apparatus which can be easily and reliably operated at night or in a dark place without increasing power consumption and therefore without increasing its size or degrading its portability, and which can reduce cost.

According to one aspect of the present invention, there is provided a wireless remote control apparatus comprising:

first and second case means each having a portable size and providing an operation portion, disposed at least on an inner surface thereof, for setting operation conditions of an appliance to be controlled;

hinge means for connecting the first and second case means to form a book type case which can be freely opened/closed while the operation portions oppose each other; and transmitting means, disposed at the hinge means, for radio-transmitting transmission data representing operation conditions, of the appliance to be controlled, set by the operation portions to the appliance to be controlled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given, below, serve to explain the principles of the invention.

FIGS. 7A, 7B, 7C, and 7D, are a rear view, a side view, a top view, and a bottom view, respectively, showing an outer appearance of the wireless remote control apparatus shown in FIG. 1;

DETAILED DESCRIPTION OF THE PREFERRED EMBODIMENTS

Figure 1:
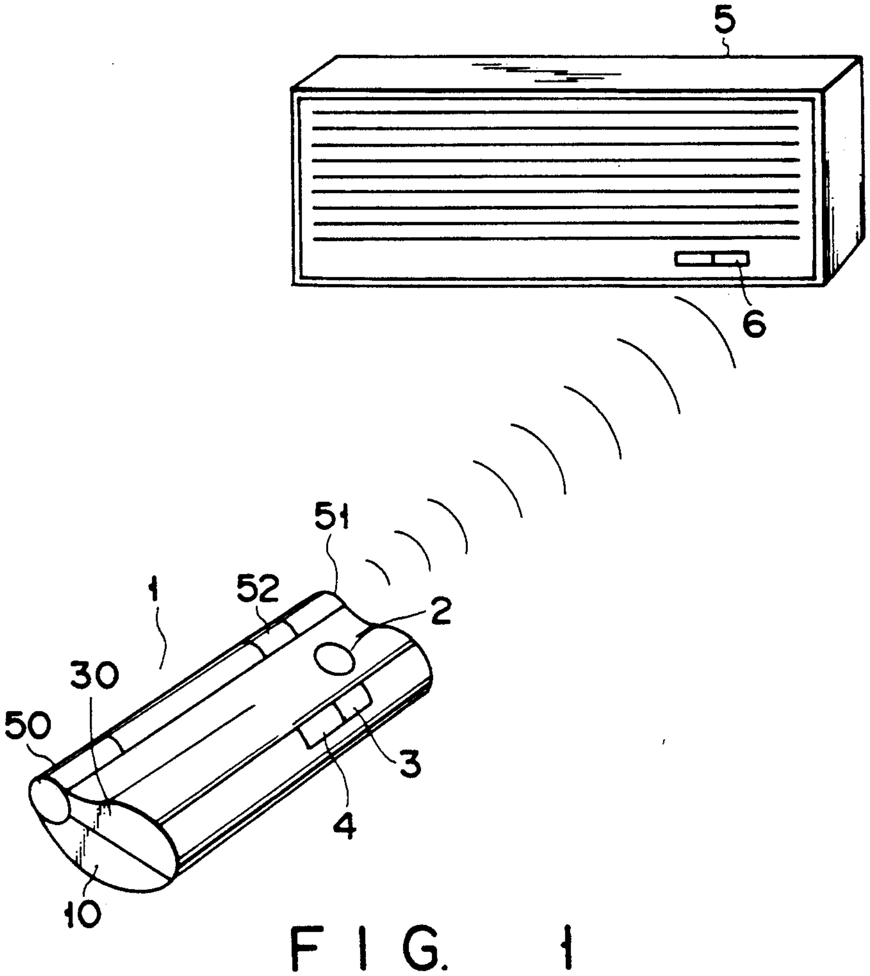
FIG. 1 is a perspective view showing an outer appearance of an embodiment of a wireless remote control apparatus according to the present invention applied to an air conditioner.

Reference will now be made in detail to the presently preferred embodiments of the invention as illustrated in the accompanying drawings, in which like reference characters designate like or corresponding parts throughout the several drawings.

FIG. 1 shows an embodiment of the present invention applied to control an air conditioner.

Referring to FIG. 1, reference numeral 1 denotes a wireless remote control apparatus having an internal battery as a power source. The apparatus 1 includes a start/stop button 2 and simple function buttons 3 and 4 located on the upper surface of a hand-held type main body, and two operation panels (to be described later) formed inside the main body. The apparatus 1 transmits transmission data for setting various operation conditions corresponding to operations of a user to an air conditioner 5 as an external apparatus to be controlled.

The air conditioner 5 has a receiver 6, located at a lower portion of the front surface, for receiving the transmission data from the apparatus 1.

Figure 2:
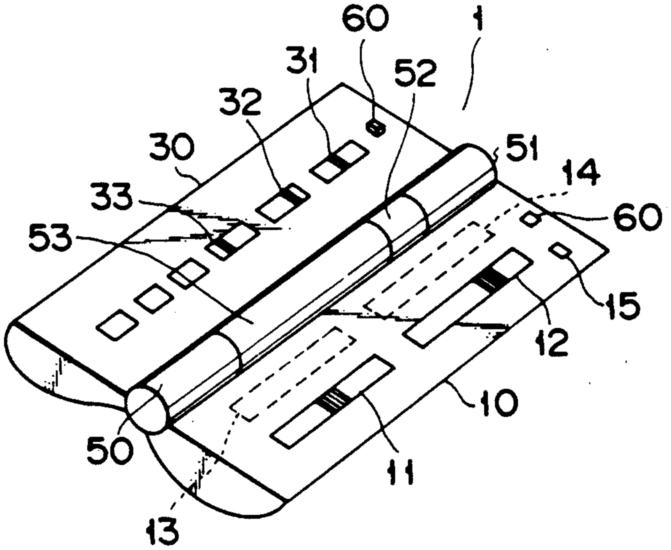
FIG. 2 is a developed perspective view showing a schematic arrangement of the wireless remote control apparatus shown in FIG. 1.

As shown in FIG. 2, the apparatus 1 has a so-called book type structure in which a case 10 and a case 30 are connected to be freely opened/closed by a hinge 50. By opening the two cases, the two operation panels are exposed to enable setting of an operation time or a room temperature.

Figure 6:
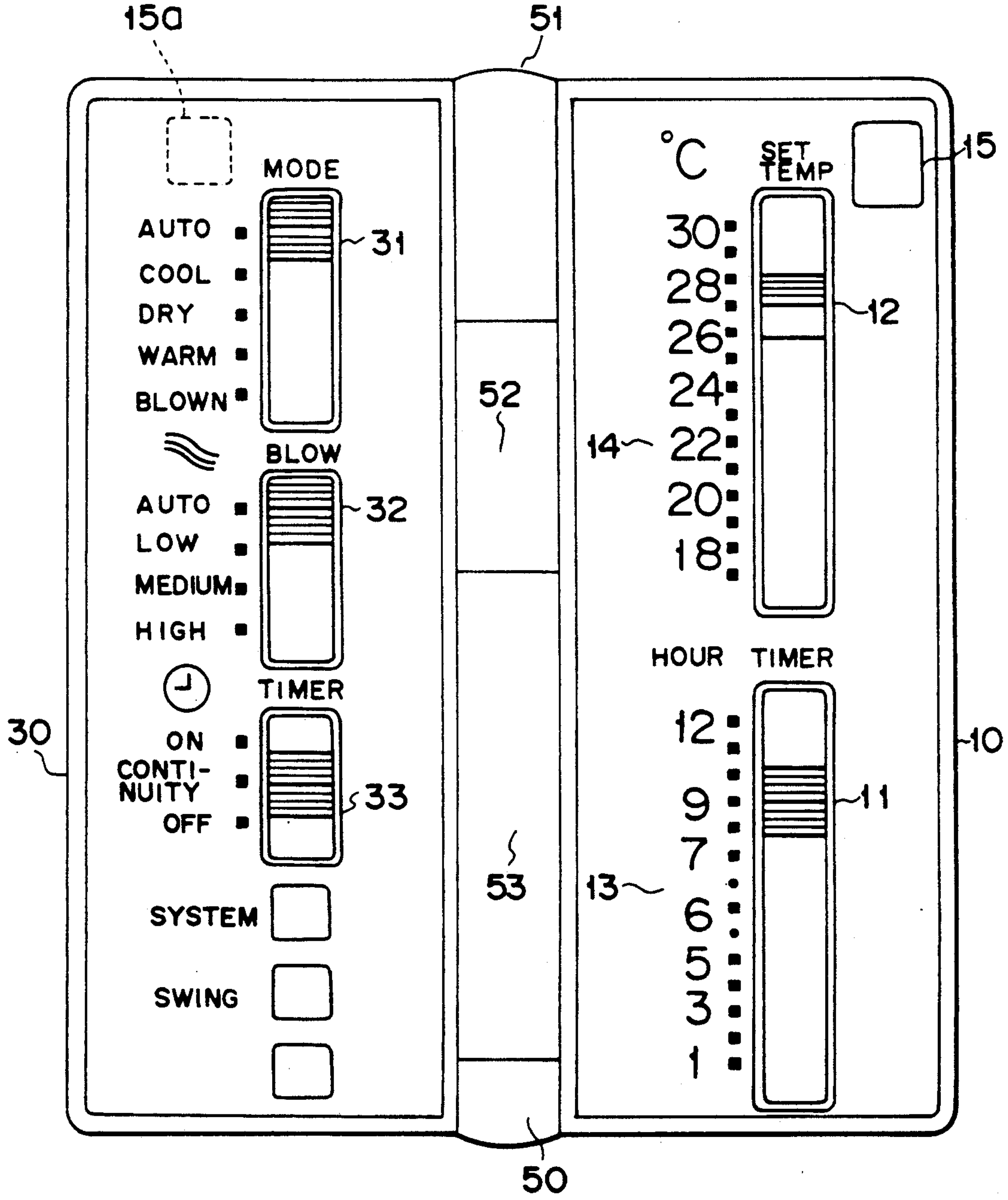

As shown in detail at the right side of FIG. 6, the case 10 has, on its operation panel, a timer knob 11 (for setting any of 1, 2, . . . , 12 hours), a temperature set knob 12 (for setting any of 18°, 19°, . . . , 30° C.), a time indicator 13, a temperature indicator 14, and a brightness detector 15.

The timer knob 11 is for setting an operation time and constitutes an operation portion together with the time indicator 13. Both the knob and the indicator have large sizes to improve the operability.

The temperature set knob 12 is for setting a room temperature and constitutes an operation portion together with the temperature indicator 14. Both the knob and the indicator have large sizes to improve the operability.

The brightness detector 15 is for detecting an ambient brightness and includes an internal brightness sensor 18 (to be described later). Note that a brightness detector 15*a* may be arranged on the case 30 side as indicated by a broken line in FIG. 6.

As shown in detail at the left side of FIG. 6, the case 30 has operation portions such as an operation mode switching knob 31 for setting an operation mode to any of AUTO, COOL, DRY, WARM, and BLOWN, a blow switching knob 32 for setting a blow to any of AUTO, LOW, MEDIUM, and HIGH, and a timer switching knob 33 (for setting any of ON, OFF, and CONTINUITY). These knobs also have large sizes to improve the operability.

Figure 5:
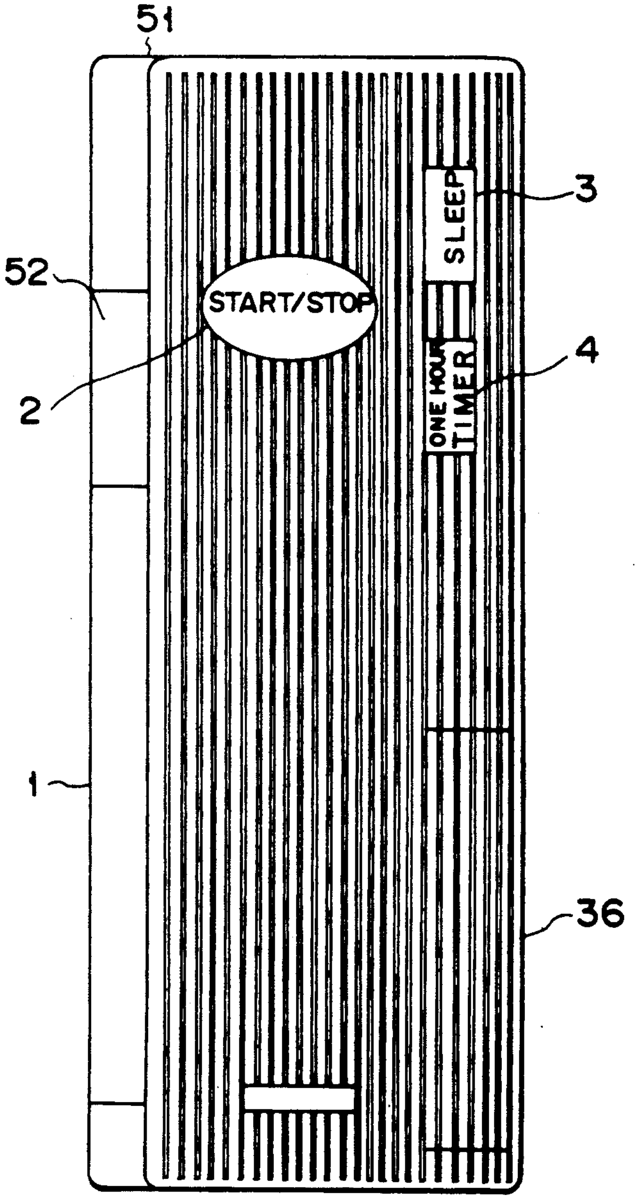
FIGS. 5 and 6 are a front view and a developed plan view, respectively, showing an operation portion of the wireless remote control apparatus shown in FIG. 1.

As shown in detail in FIG. 5, the case 30 also has, as outer operation portions, the operation start/stop button 2 and a sleep button and a one hour timer button as the simple function buttons 3 and 4, respectively, as described above.

The hinge 50 has a transmitter 51 at its upper end, a transmission monitor indicator 52 as an indicator at its middle portion, and a battery housing 53 for a battery for driving an illumination (back light) power circuit.

Figure 3:
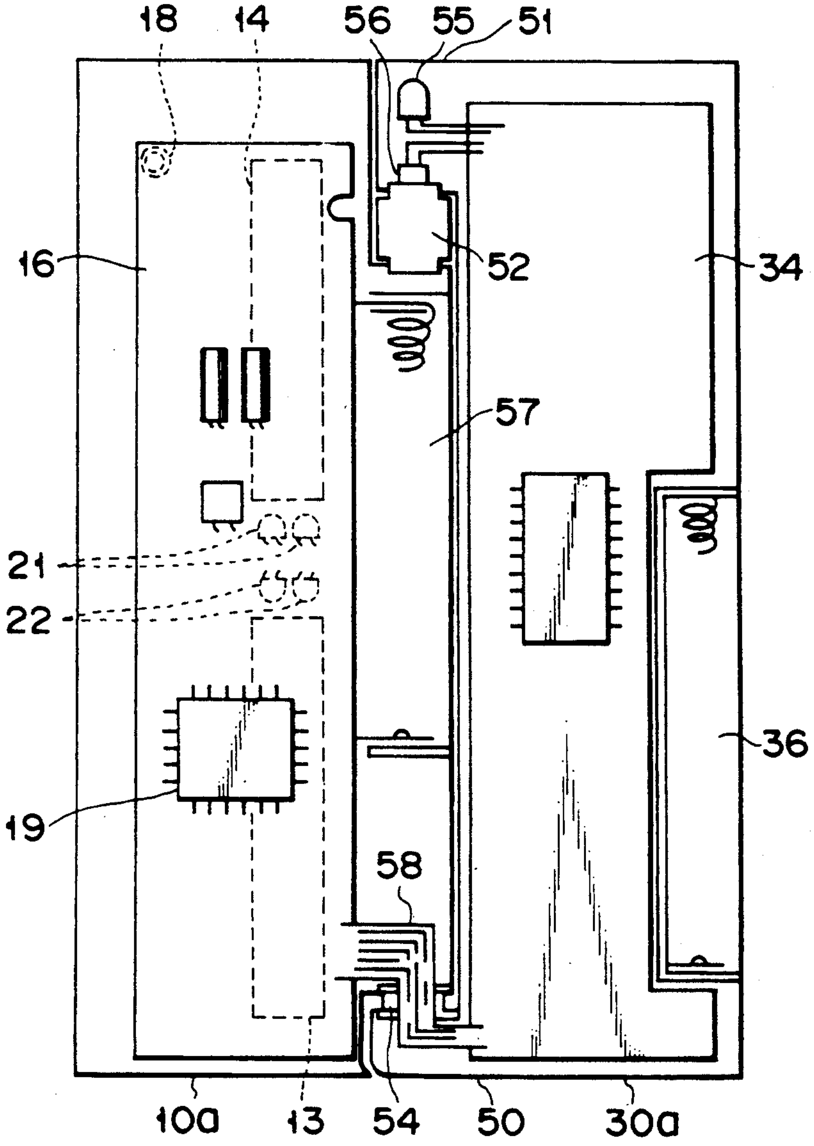
FIGS. 3 and 4 are developed plan view and a developed bottom view, respectively, showing an internal arrangement of the wireless remote control apparatus shown in FIG. 1.

The transmitter 51 includes an internal transmission light-emitting diode (transmitting circuit) 55 (FIG. 3).

The transmission monitor indicator 52 is a molded cylindrical transparent member made of, e.g., plastic exposed along the circumferential surface of the hinge 50 so as to be seen from inside and outside the apparatus 1. The indicator 52 has an internal monitoring light-emitting diode 56 (to be described later).

The battery housing 53 has a battery chamber 57 (to be described later).

Opening/closing detection (door-interlocked) switches 60 are located at corresponding positions of the cases 10 and 30 to detect opening/closing of the cases 10 and 30.

Figure 4:
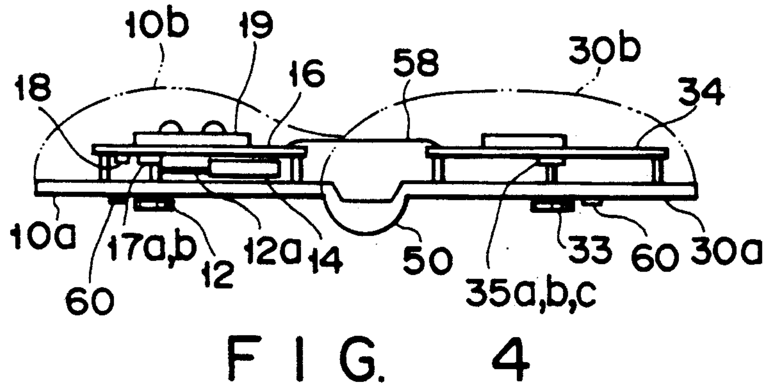

As shown in FIGS. 3 and 4, the case 10 comprises an inner case 10*a* and an outer case 10*b*, and the case 30 comprises an inner case 30*a* and an outer case 30*b*. FIGS. 3 and 4 show states viewed from the outer case side, in which the outer cases 10*b* and 30*b* are removed.

That is, a printed circuit board 16 is mounted on the inner case 10*a*. One surface of the circuit board 16 mounts a slide volume 17*a* for setting a temperature, a slide volume 17*b* for setting a time, the time indicator 13, the temperature indicator 14, the brightness (CdS) sensor (photosensor) 18 for detecting an ambient brightness, and time indicating light-emitting diodes (back-light lighting circuits) 22 as illuminating means, and temperature indicating light-emitting diodes (back-light lighting circuits) 21.

The temperature and time set slide volumes 17*a* and 17*b* are connected to the temperature and time set knobs 12 and 11, respectively.

The diodes 22 are back-light lighting circuits for transmission-illuminating the time indicator 13, and the diodes 21 are back-light lighting circuits for transmission-illuminating the temperature indicator 14.

Since the time and temperature indicators 13 and 14 are operation portions having high operation frequencies, the diodes 21 and 22 as back-light lighting circuits are provided for only the operation portions having high operation frequencies (e.g., those portions frequently used) to facilitate operation of the portions at night.

The other surface of the circuit board 16 mounts a CPU (central processing unit) 19 as a main controller and various types of electronic parts.

A printed circuit board 34 is mounted on the inner case 30*a*. One surface of the circuit board 34 mounts a timer switch 35*a*, a blow switch 35*b*, an operation mode switch 35*c*, and the like.

The timer switch 35*a*, the blow switch 35*b*, and the operation mode switch 35*c* are connected to the timer switching knob 33, the blow switching knob 32, and the operation mode switching knob 31, respectively.

The other surface of the circuit board 34 mounts various types of electronic parts.

The inner case 30*a* also has a battery housing 36 for a battery for driving a power source of a controlling (transmitting) circuit.

The hinge 50 includes a connecting member 54 for connecting the inner cases 10*a* and 30*a*, a transmission light-emitting diode (infrared rays) 55 as a component of the transmitter 51, a monitoring light-emitting diode 56 as a component of the transmission monitor indicator 52, a battery housing 57 at a position corresponding to the battery housing 53, and a flat cable 58 for electrically connecting the printed circuit boards 16 and 34.

FIGS. 7A, 7B, 7C, and 7D are rear, side, top, and bottom views, respectively, showing an outer appearance of the entire remote control apparatus 1. As is apparent from FIGS. 7A to 7D, the lower surface of the remote control apparatus main body is curved to project downward so that a user can easily grip the apparatus, and its upper surface is curved to form a recess so that a user can easily operate the apparatus. The apparatus 1 has a width of 58.5 mm, a length of 160 mm, a height of 28 mm, and a weight of about 150 g.

Figure 8:
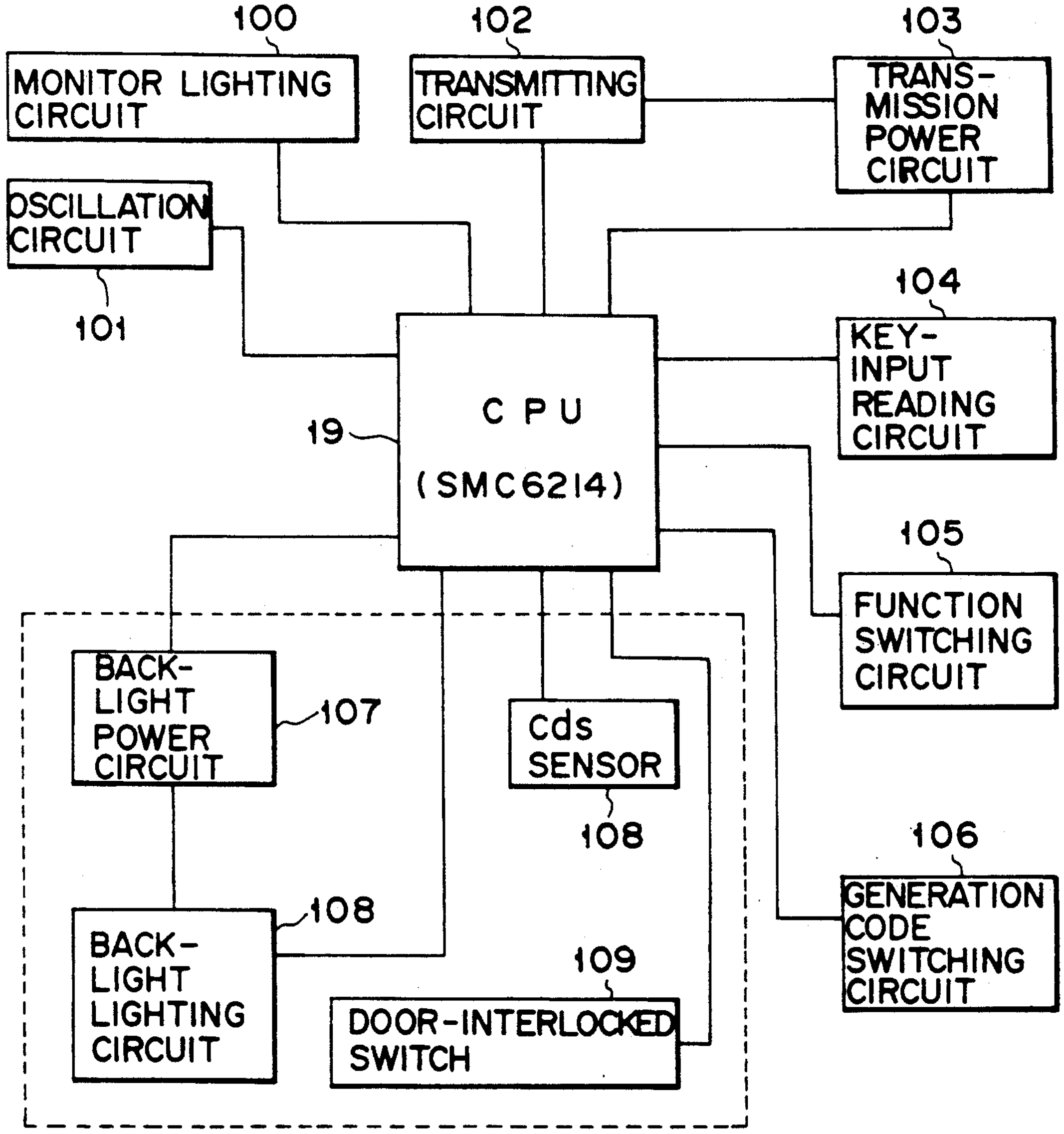
FIG. 8 is a block diagram showing an electrical connection of the wireless remote control apparatus shown in FIG. 1.

FIG. 8 shows an electrical connection of the remote control apparatus 1. Referring to FIG. 8, the CPU 19 is connected to a monitor lighting circuit 100, an oscillation circuit 101, a transmitting circuit 102, a transmission power circuit 103, a key-input reading circuit 104, a function switching circuit 105, a generation code switching circuit 106, a back-light power circuit 107, a back-light lighting circuit 108, a CdS sensor 109, and a door-interlocked switch 110.

An operation of the above arrangement will be described below.

When the cases 10 and 30 are opened, this is detected by the opening/closing detection switches 60 (door-interlocked switch 110), and an ambient brightness is detected by the brightness detector 15 (CdS sensor 109). If the brightness is a predetermined value or less, the indication light-emitting diodes 21 and 22 (back-light lighting circuits 108) are turned on. As a result, the time indicator 13 and the temperature indicator 14 are transmission-illuminated.

Therefore, a user can rapidly and reliably operate the operation time set knob 11 and the temperature set knob 12 even in darkness.

Upon operations of these knobs, the transmission light-emitting diode 55 (transmitting circuit 102) of the transmitter 51 is turned on/off in accordance with operation conditions based on the operations, and transmission data representing the operation conditions is transmitted to the air conditioner 5. In this case, the monitoring light-emitting diode 56 (monitor lighting circuit 100) of the transmission monitor indicator 52 is simultaneously turned on to emit light through the surrounding transparent member, thereby indicating that the data is being transmitted. That is, the user is informed of this information.

The diodes 21 and 22 are turned off under the control of the CPU 19 when a predetermined time elapses after light emission is started.

The transmission light-emitting diode 55 of the transmitter 51 and its peripheral portion are parts having the most limited degree of dimensional freedom. Since these parts are located not in the cases 10 and 30 having the operation portions but in the hinge 50, the size of the apparatus 1 is not increased even if the operation portions are increased in size.

That is, since the area or thickness of the case 10 or 30 is not increased even if the operation portions are increased in size, the operability can be improved while the compactness of the apparatus 1 is maintained. This advantageously facilitates a pattern design of the printed circuit boards 16 and 34 and improves an outer appearance design.

The transmission light-emitting diode 56 of the transmission monitor indicator 52 for indicating whether transmission is performed is one of parts not having a degree of dimensional freedom. Since, however, the diode 56 is also located in the hinge 50, the operation portions can be increased in size while the compactness of the apparatus 1 is maintained.

The start/stop button 2 for most basic automatic operation and the sleep button 3 and the one hour timer button 4 for safety are arranged on the outer surface of the case 30. Therefore, a user can easily remote control the air conditioner by only operating these basic buttons provided that a desired temperature is set.

In addition, the hinge 50 having the transmission monitor indicator 52 can be easily checked both from the front side (case 30 side) and the rear side (case 10 side) of the apparatus. Therefore, data representing whether transmission is performed can be easily indicated for a user even if both case 10 and case 30 are opened or closed each other, thereby improving the reliability.

Another embodiment of the present invention will be described below. This embodiment is the same as the first embodiment shown in FIGS. 1 to 5 and 7 except that a part of an operation portion shown in FIG. 9 and an electrical connection shown in FIG. 10 partially differ from those of the first embodiment shown in FIGS. 2, 6, and 8.

Figure 9:
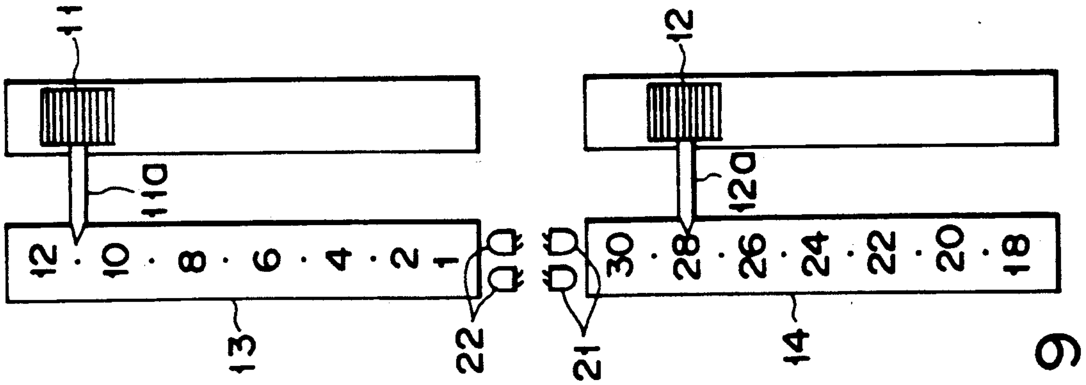
FIG. 9 is a view showing a modification of a part of the operation portion shown in FIG. 5.

That is, a time set knob 11 is arranged above a temperature set knob 12 in FIG. 9 while the temperature set knob 12 is arranged above the time set knob 11 in FIG. 6. In addition, the knobs 11 and 12 have pointers **11*a* and 12*a* extending over time and temperature indicators 13 and 14**, respectively.

Figure 10:
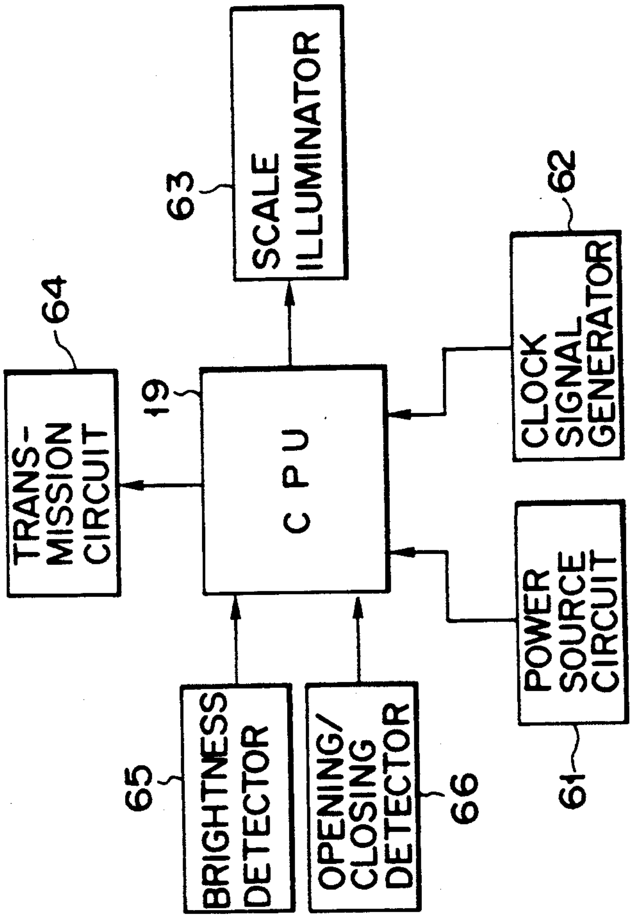
FIG. 10 is a block diagram showing a modification of a part of a controller shown in FIG. 8.

Referring to FIG. 10, a CPU 19 is connected to a power source circuit 61, a clock signal generator 62, a scale illuminator 63, a transmission circuit 64, a brightness detector 65, and an opening/closing detector 66.

The power source circuit 61 applies voltages of batteries housed in housings 57 and 36 to the above circuits including the CPU 19 as operation voltages.

The scale illuminator 63 controls indication diodes 21 and 22 in accordance with a command from the CPU 19.

The transmission circuit 64 controls a transmission light-emitting diode 55 and a monitoring light-emitting diode 56 in accordance with a code signal supplied from the CPU 19.

The brightness detector 65 has a brightness sensor 18 as a component and outputs a signal having a voltage level corresponding to an ambient brightness.

The opening/closing detector 66 has switches 60 (FIG. 2) interlocked with opening/closing of cases 10 and 30 and detects opening/closing of the cases 10 and 30.

Figure 11:
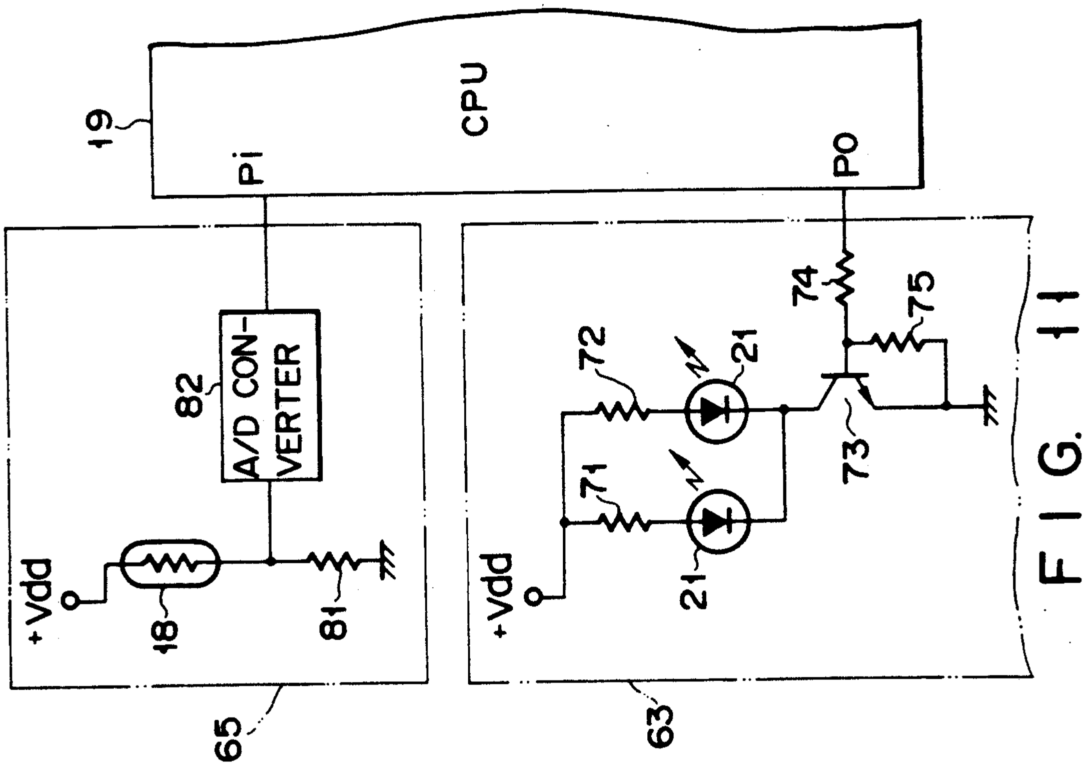
FIG. 11 is a circuit diagram showing in detail an arrangement of a main part of FIG. 10.

Detailed arrangements of the scale illuminator 63 and the brightness detector 65 are shown in FIG. 11.

In the scale detector 63, DC voltages Vdd are applied to the cathodes of the indication light-emitting diodes 21 via resistors 71 and 72, respectively, and the anodes of the diodes 21 are grounded via the collector-emitter path of an NPN transistor 73. An output port Po of the CPU 19 is grounded via resistors 74 and 75, and the base-emitter path of the transistor 73 is connected to the two ends of the resistor 75.

Although not shown in FIG. 11, the indication light-emitting diodes 22 have the same circuit arrangement.

That is, when a high voltage appears at the output port Po of the CPU 19 (logic "1"), the transistor 73 is switched on to turn on the diodes 21.

The brightness detector 65 applies the DC voltage Vdd to the brightness sensor (photosensor) 18 via a resistor 81, converts a voltage generated in the resistor 81 into a digital signal by an A/D (analog/digital) converter 82, and outputs the signal as brightness data. This brightness data is supplied to an input port Pi of the CPU 19.

That is, the brightness data indicating an ambient brightness is supplied to the CPU 19.

The CPU 19 further comprises means for determining use or nonuse of the apparatus in accordance with an output from the opening/closing detector 66, means for turning on the diodes 21 and 22 when a detection result from the brightness detector 65 is a predetermined value or less, and means for controlling an ON time of the diodes in accordance with a detection result from the brightness detector 65.

An operation of the above arrangement will be described below.

When the cases 10 and 30 are opened, this is detected by the opening/closing detector 66, and the CPU 19 determines that the apparatus is in use.

Figure 12:
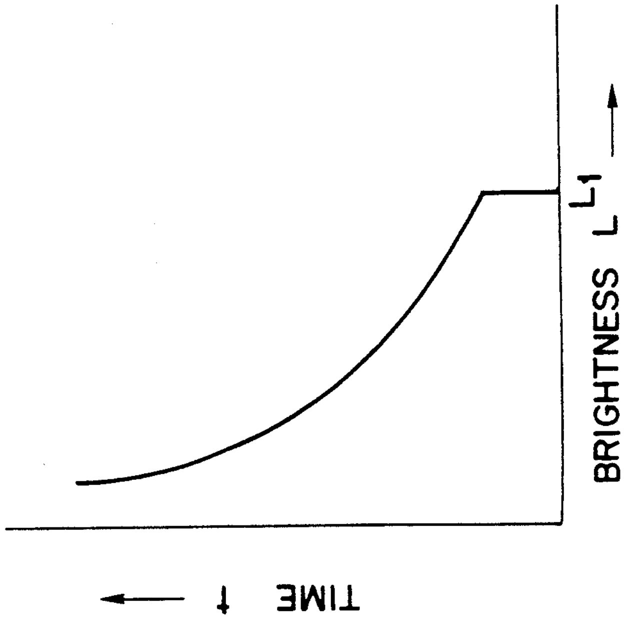
FIG. 12 is a graph for explaining an operation of FIG. 11.

In this state, the CPU 19 reads out the brightness data from the brightness detector 65. When an ambient brightness L is a predetermined value $L_1$ or less as shown in FIG. 12, the diodes 21 and 22 are turned on.

Therefore, a user can rapidly and reliably operate the time set knob 11 and the temperature set knob 12 even at night or in a dark room.

When the knobs are operated, the CPU 19 turns on/off the transmission light-emitting diode 55 in accordance with operation conditions based on the operation, and transmits the operation conditions to the air conditioner 5. At the same time, the CPU 19 turns on the monitoring light-emitting diode 56 to inform a user that transmission is being performed.

In addition, the CPU 19 counts a time elapsed from the start of an ON state by an internal timer. When a predetermined time t elapses from the start of the ON state, the CPU 19 turns off the diodes 21 and 22.

As the brightness L is lowered, the predetermined time t from the ON to OFF state is prolonged.

Since the ON time t is increased as the brightness L is decreased, operation reliability is improved to prevent a setting failure.

If the brightness L is not so low, i.e., if an operation can be rather easily performed, power consumption is reduced because the ON time t is shortened. In addition, since the diodes are turned on only when an ambient space is dark, power consumption of the batteries can be suppressed. Therefore, since a large number of batteries are not required, the size of the apparatus is not increased or its portability is not degraded.

Furthermore, the diodes 21 and 22 are provided for only operation parts having high use frequencies. This contributes to suppress power consumption of the batteries, and the number of parts can be decreased to reduce cost.

If the cases 10 and 30 are closed during the ON state of the diodes 21 and 22 (within the time t), this is detected by the opening/closing detector 66, and the CPU 19 determines that the use of the apparatus is ended.

Therefore, the CPU 19 immediately turns off the diodes 21 and 22 and resets the internal timer. When the cases 10 and 30 are opened, the CPU 19 repeats the above operation.

In the above embodiments, the present invention is applied to the air conditioner. The present invention, however, can be similarly applied to another electric appliance.

In addition, the present invention is not limited to the above embodiments but can be variously modified without departing from the spirit and scope of the invention.

As has been described above, the remote control apparatus according to the present invention comprises a pair of cases having operation portions, a hinge for connecting the cases to form a book type case which can be freely opened/closed, and a transmitter, provided at the hinge, for transmitting operation contents of the operation portions to an external apparatus. Therefore, the operation portions can be increased in size and therefore the operability can be improved while the compactness of a main body is maintained.

In addition, the remote control apparatus according to the present invention comprises a pair of cases having operation portions, a hinge for connecting the cases to form a book type case which can be freely opened/closed, a transmitter, provided at the hinge, for transmitting operation contents of the operation portions to an external apparatus, and an indicator, provided at the hinge, for externally indicating an operation state of the transmitter. Therefore, the operation portions can be increased in size and therefore the operability can be improved, and whether transmission is being performed can be reliably informed to a user, while the compactness of a main body is maintained.

Furthermore, the remote control apparatus according to the present invention comprises illuminating means for illuminating operation portions, a brightness sensor for detecting an ambient brightness, means for turning on the illuminating means when a detection result of the brightness sensor is a predetermined value or less, and means for controlling an ON time of the illuminating means in accordance with the detection result of the brightness sensor. Therefore, an operation can be easily and reliably performed at night or in a dark place without increasing power consumption and therefore without increasing the size of the apparatus or degrading its portability.

Moreover, the remote control apparatus according to the present invention comprises illuminating means, provided for operation portions having high use frequencies, for illuminating the operation portions, a brightness sensor for detecting an ambient brightness, means for turning on the illuminating means when a detection result is a predetermined value or less, and means for controlling an ON time of the illuminating means in accordance with the detection result of the brightness sensor. Therefore, an operation can be easily and reliably performed at night or in a dark place and cost can be reduced without increasing power consumption and therefore without increasing the size of the apparatus or degrading its portability.

What is claimed is:

1. A wireless remote control apparatus for controlling an appliance having operating conditions, the apparatus comprising:

first and second case means each having a portable size and providing first operating portions, disposed on inner surfaces thereof, and second operating portions disposed on an outer surface of one of said first and second case means, for selectively setting operation conditions of said appliance;

movable joint means, having an opening/closing support, for connecting said first and second case means to form a book type case which can be freely opened/closed while said first operation portions which are disposed on the inner surfaces of said first and second case means oppose each other;

transmitting means, disposed in said opening/closing support of said movable joint means, for radio-transmitting transmission data representing said set operating conditions from said first and second operation portions; and indicating means which includes a cylindrical transparent member and a light-emitting device disposed inside said cylindrical transparent member and is disposed at said movable joint means, for indicating an operation state of said transmitting means when said transmitting means transmits said transmission data, wherein said indicating means indicates an operation state of said transmitting means by light emitted from said light-emitting device radiating through said cylindrical transparent member to the outside thereof, both when a user operates said first operation portion disposed on the inner surfaces of said first and second case means in a state where said book type case is open, and when the user operates said second operation portion disposed on the outer surface of said first and second case means in a state where said book-type case is closed.

2. An apparatus according to claim 1, wherein at least one of said first and second case means incorporates transmission data generating means for generating the transmission data.

3. An apparatus according to claim 1, wherein at least one of said first and second case means provides a predetermined number of operation members for setting operation conditions of said appliance to be controlled.

4. An apparatus according to claim 1, wherein said transmitting means is located in an end portion along said opening/closing support of said movable joint means.

5. An apparatus according to claim 1, wherein at least one of said first and second case means includes signal supply means for supplying a signal to said indicating means, said signal representing that said transmitting means is transmitting the transmission data.

* * * * *